United States Patent
Chapman et al.

(10) Patent No.: US 10,574,356 B2
(45) Date of Patent: Feb. 25, 2020

(54) VIRTUAL PHYSICAL LAYER

(71) Applicant: Cisco Technology, Inc., San Jose, CA (US)

(72) Inventors: John T. Chapman, Coto de Caza, CA (US); Hang Jin, Plano, TX (US); Alon Shlomo Bernstein, Monte Sereno, CA (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 15/880,687

(22) Filed: Jan. 26, 2018

(65) Prior Publication Data

US 2019/0238229 A1    Aug. 1, 2019

(51) Int. Cl.
*H04B 10/2575*    (2013.01)
*H04W 88/08*    (2009.01)
*H04W 92/02*    (2009.01)

(52) U.S. Cl.
CPC . *H04B 10/25751* (2013.01); *H04B 10/25753* (2013.01); *H04W 88/085* (2013.01); *H04W 92/02* (2013.01)

(58) Field of Classification Search
None
See application file for complete search history.

(56) References Cited

U.S. PATENT DOCUMENTS

| | | | |
|---|---|---|---|
| 2010/0198590 A1* | 8/2010 | Tackin | G10L 25/90 704/214 |
| 2014/0369194 A1* | 12/2014 | Friedman | H04L 47/32 370/235 |
| 2015/0271268 A1* | 9/2015 | Finkelstein | H04L 67/12 370/400 |
| 2018/0175936 A1* | 6/2018 | Jia | H04B 10/541 |
| 2018/0325384 A1* | 11/2018 | Agarwal | H01L 41/087 |

* cited by examiner

*Primary Examiner* — Mohamed A Kamara
*Assistant Examiner* — Saad Khawar
(74) *Attorney, Agent, or Firm* — Merchant & Gould P.C.

(57) ABSTRACT

A virtual physical layer may be provided. When providing the virtual physical layer, a remote radio head may be used. The remote radio head may comprise a first interface device, a second interface device, a digital-to-analog converter, and an analog-to-digital converter. The first interface device may be connected to a virtual physical layer instance instantiated in a cloud-based environment. The second interface device may be connected to customer premises equipment. The digital-to-analog converter may be connected between the first interface device and the second interface device and the analog-to-digital converter may also be connected between the first interface device and the second interface device.

19 Claims, 5 Drawing Sheets

VIRTUAL PHYSICAL LAYER

TECHNICAL FIELD

The present disclosure relates generally to virtualizing a physical layer.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

A virtual physical layer may be provided. When providing the virtual physical layer, a remote radio head may be used. The remote radio head may comprise a first interface device, a second interface device, a digital-to-analog converter, and an analog-to-digital converter. The first interface device may be connected to a virtual physical layer instance instantiated in a cloud-based environment. The second interface device may be connected to customer premises equipment. The digital-to-analog converter may be connected between the first interface device and the second interface device and the analog-to-digital converter may also be connected between the first interface device and the second interface device.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) may comprise operators of multiple cable or direct-broadcast satellite television systems. Fiber deep (FD) is a trend in which MSOs push fiber closer to customer premises equipment to provide users with better service. In order to facilitate FD, an optical HFC node comprising a Remote PHY Device (RPD) may be placed in the HFC network. As opposed to an amplifier, the RPD may receive signals from an MSO's headend via fiber optic cable rather than via coaxial cable for example. Accordingly, the optical HFC node comprising the RPD may be located at a junction of a fiber plant and a coaxial plant in the HFC network. In order to provide FD, many RPDs may be deployed in the HFC network.

A Cable Modem Termination System (CMTS) may provide high speed data services, such as cable Internet or Voice over Internet Protocol (VOIP) to users who may comprise MSO subscribers. Located in the MSO's headend, the CMTS may communicate with the RPD via fiber optic cable. The CMTS may be included in a Converged Cable Access Platform (CCAP) core. The CCAP core may control and setup data paths with multiple RPDs situated in multiple optical HFC nodes in the HFC network.

One problem may be that the RPD may have limited thermal and signal processing capability. As newer and more complex functionality is added to the RPD, the cost and power consumption of the RPD may increase that may result in excessive RPD cost and power consumption. Consequently, embodiments of the disclosure may provide a virtual physical layer by removing some of the RPD's functionality from the optical HFC node and distributing it in a cloud environment with some the RPD's functionality (e.g., analog functions) remaining in the optical HFC node. The remaining functionality may comprise, but is not limited to, amplifier functionality, front end gain control, Radio Frequency (RF) filtering, digital-to-analog data conversion, and analog-to-digital data conversion for example. In other words, embodiments of the disclosure may identify RPD functions in the optical HFC node that may be virtualized and move these functions to a cloud-based virtualized RPD. Functions of the RPD not virtualized (e.g., analog functions) may remain in the optical HFC node. The optical HFC node that remains in the HFC network with these remaining functions may comprise a Remote Radio Head (RRH). Embodiments of the disclosure may also include an interface between the virtualized RPD functions and the functions that remain in the optical HFC node. Accordingly, with embodiments of the disclosure, the cost and power consumption of the optical HFC node that remains in the HFC network (e.g., the RRH) may be reduced.

Furthermore, with the virtual physical layer, processing efficiency may be improved because downstream (DS) multicast video can be processed once in the cloud and multicast to multiple RRHs. In addition, better scaling may be provided because the aforementioned virtualized RPD functionality may be scaled dynamically in the cloud according to actual spectrum usage. For example, the virtualized RPD functionality capability can be planned to handle only one full duplex (FDX) upstream (US) channel (e.g., 96 MHz) if there is only one active FDX US channel, and additional virtualized RPD functionality may be added when more FDX US channels are added in the future. In addition, the RRH may be protocol agnostic because once the RRH is deployed, no changes may be needed even if there are some changes to the underlying protocols.

Figure 1:
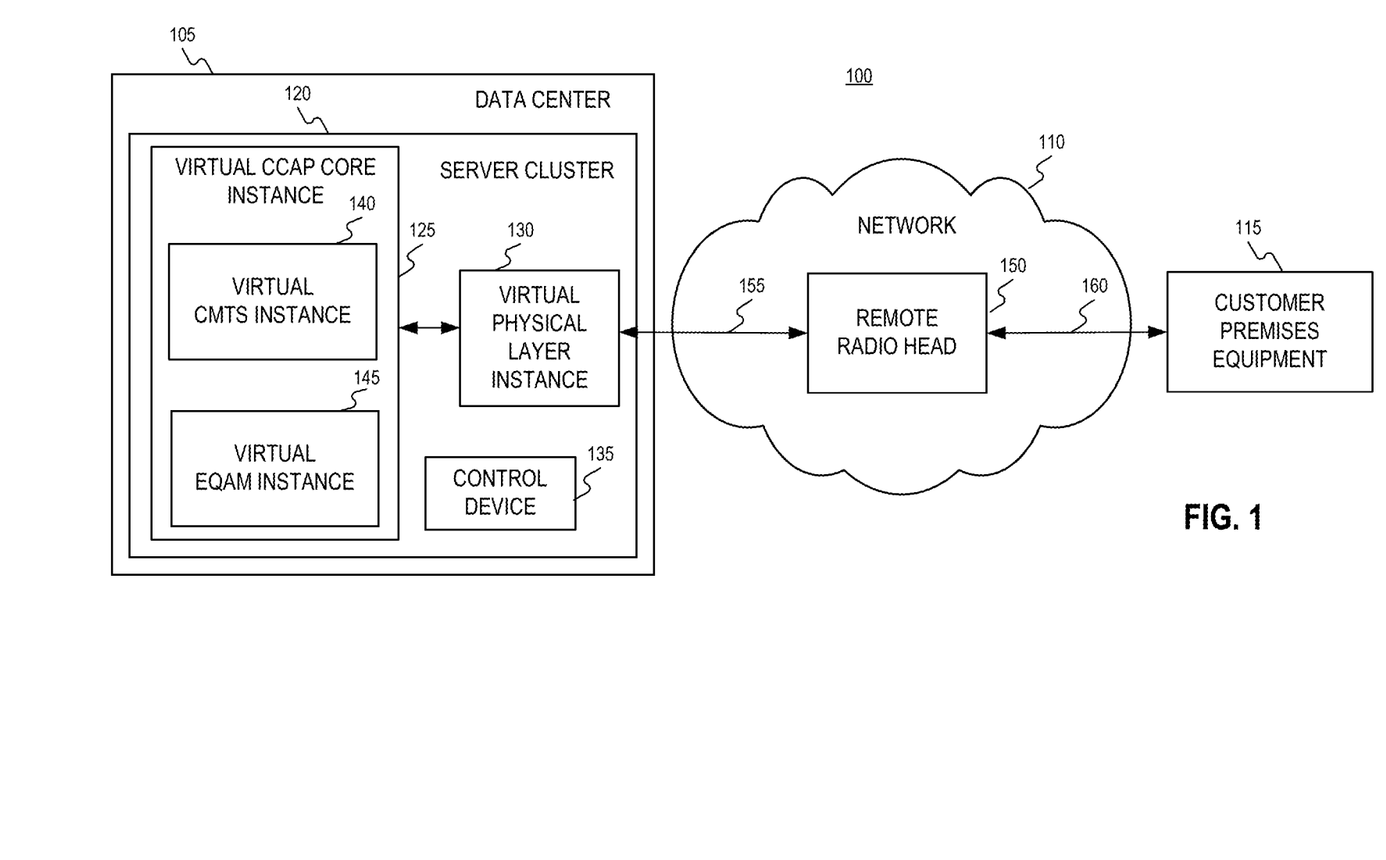
FIG. 1 is a block diagram of a system for providing a virtual physical layer.

FIG. 1 is a block diagram of a system 100 for providing a virtual physical layer. As shown in FIG. 1, system 100 may comprise a data center 105, a network 110, and a customer premises equipment 115. System 100 may use the Open Systems Interconnection (OSI) model that characterizes and standardizes the communication functions of a telecommunication or computing system without regard to its underlying internal structure and technology.

Data center 105 may comprise a server cluster 120 that may operate in a cloud-based environment. Server cluster 120 may include a virtual CCAP core instance 125, a virtual physical layer instance 130, and a control device 135. Virtual CCAP core instance 125 may include a plurality of Virtual Network Function (VNF) containers. The plurality of VNF containers may comprise, but are not limited to, a virtual CMTS instance 140 and a virtual Edge Quadrature Amplitude Modulator (EQAM) instance 145. Plurality of VNF containers may comprise any number of VNF containers and is not limited to the aforementioned. The plurality of VNF containers may each comprise software modules that when taken as a whole may provide the functionality of virtual CCAP core instance 125 instantiated in data center 105. The plurality of VNF containers and virtual physical layer instance 130 may reside on the same server (i.e., service cluster 120) or may reside on different servers or in different data centers. Virtual CMTS instance 140 may support Data Over Cable Service Interface Specification (DOCSIS) data transport and EQAM instance 145 may support video transport. Virtual CMTS instance 140 may contain the DOCSIS MAC (signaling functions, downstream and upstream bandwidth scheduling, and DOOCSIS framing) and the upper layer protocols.

Control device 135 (i.e., an orchestrator) may dynamically scale (e.g., instantiate or delete) virtual CCAP core instances and a virtual physical layer instances in server cluster 120 based on the needs of system 100 (e.g., actual spectrum usage). Control device 135 may comprise a software-defined networking (SDN) controller. As such, control device 135 may be embodied in hardware and/or in software (including firmware, resident software, micro-code, etc.) and is not limited to being a hardware device.

Network 110 may comprise, but is not limited to, an HFC network. Network 110 may include a Remote Radio Head (RRH) 150 as described in greater detail below with respect to FIG. 2. RRH 150 may comprise an optical HFC node and may be located at a junction of a fiber plant and a coaxial plant in network 110. For example, a first link 155 may comprise a fiber link to data center 105 and a second link 160 may comprise a coaxial link to customer premises equipment 115. Customer premises equipment 115 may comprise, but is not limited to, a cable modem, a cellular base station, a tablet device, a mobile device, a smart phone, a telephone, a remote control device, a set-top box, a digital video recorder, a personal computer, a network computer, a mainframe, a router, or other similar microcomputer-based device.

As stated above, system 100 may use the Open Systems Interconnection (OSI) model. As such, communications over first link 155 may comprise Layer-1 data. Furthermore, communications between virtual CCAP core instance 125 and virtual physical layer instance 130 may comprise Layer-2 data and Layer-3 data. Layer 1 may provide services to transmit bits or groups of bits over a transmission link between open systems and which entails electrical, mechanical, and handshaking procedures. Layer-2 may comprise the data link layer and may provide node-to-node data transfer. Layer-3 may comprise the network layer and may provide the functional and procedural means of transferring variable length data sequences (i.e., datagrams) from one node to another.

Virtual physical layer instance 130 may comprise any number of VNF containers and is not limited to the aforementioned. Virtual physical layer instance 130 may reside on the same server (i.e., service cluster 120) or may reside on different servers or in different data centers. Virtual physical layer instance 130 may be instantiated in data center 105 and may comprise a software module or modules that when taken as a whole may provide, for example, the non-analog functionality of an optical HFC node comprising an RPD. For example, virtual physical layer instance 130 may comprise a physical layer converter that may convert downstream DOCSIS data, Moving Picture Experts Group (MPEG) video, and out-of-band (OOB) signals received from virtual CCAP core instance 125 into Layer-1 data. Virtual physical layer instance 130 may then send this downstream Layer-1 data to RRH 150 over first link 155. Similarly, virtual physical layer instance 130 may receive upstream Layer-1 data from RRH 150 over first link 155. Then virtual physical layer instance 130 may convert this upstream Layer-1 data into upstream DOCSIS data, MPEG video, and out-of-band (OOB) signals and send it to virtual CCAP core instance 125.

Figure 2:
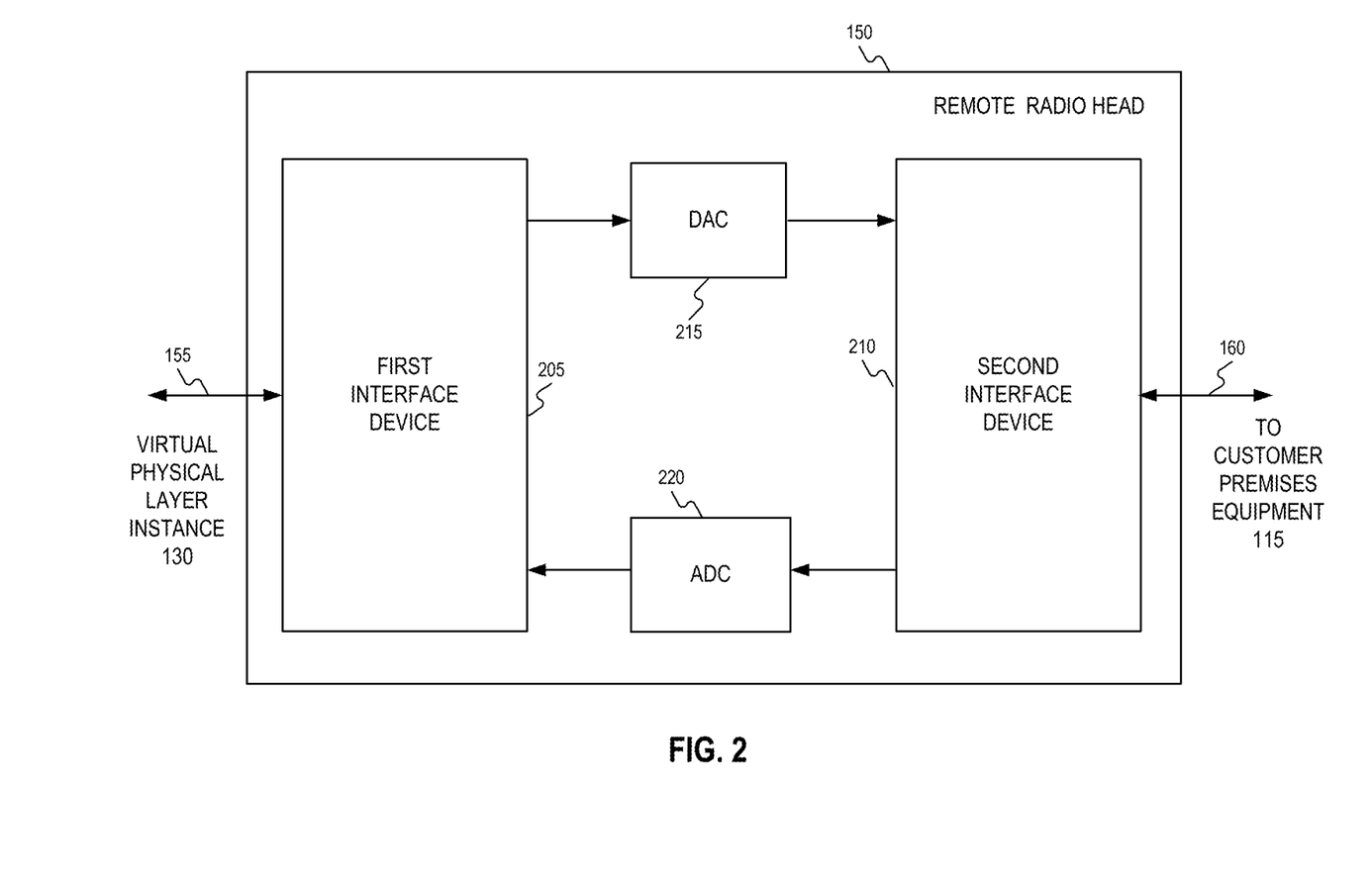
FIG. 2 is a block diagram of a remote radio head.

FIG. 2 is a block diagram of a RRH 150. As shown in FIG. 1, RRH 150 may comprise a first interface device 205, a second interface device 210, a digital-to-analog converter 215, and an analog-to-digital converter 220. RRH 150 may carry out, for example, analog functions of the RPD that were not virtualized into virtual physical layer instance 130 as described above. These functions (i.e., analog functions) may comprise, but may not be limited to, amplifier functionality, front end gain control, Radio Frequency (RF) filtering, and analog-digital data conversions, for example. Second interface device 210 may carry out, for is not limited to, amplifier functionality, front end gain control, automatic gain control, and Radio Frequency (RF) filtering on an analog signal.

Elements comprising RRH 150 (e.g., first interface device 205, second interface device 210, digital-to-analog converter 215, and analog-to-digital converter 220) may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems. Furthermore, elements comprising RRH 150 may be practiced in a system-on-a-chip (SOC) where each or many of the elements may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components on the single integrated circuit (chip).

RRH 150 may convert downstream digital Layer-1 data received from virtual physical layer instance 130 over first link 155 to analog radio frequency (RF) for transmission over second link 160 to customer premises equipment 115. At first interface device 205, downstream data received from virtual physical layer instance 130 may be buffed (e.g., de-jitter), de-framed, de-multiplexed, and de-packetized into bits. The bits may be put in a queue as the input of digital-to-analog converter 215 (or separated queues as the inputs of mutual DACs for different bands in the multi-band example described below).

Similarly, RRH 150 may convert upstream RF signals received over second link 160 to digital for transmission over first link 155 to virtual physical layer instance 130. The bits of upstream data out of analog-to-digital converter 220 may be packetized and queued in First-In-First-Out (FIFO) fashion. In the case of multi-band as described below, the data of different bands may be put in different queues with different Quality of Service (QoS). Packets of multiple queues may be multiplexed in time in frame for transmission.

Consistent with embodiments of the disclosure, packets may be FIFO according to ADC/DAC output/input bit sequences. When virtualizing the physical layer consistent with embodiments of the disclosure, an end point for supporting 1588 Precision Time Protocol (PTP) may be moved from the optical HFC node (e.g., RPD) to a point where the packet timing sync may be required. The PTP clients from multiple RRHs can be co-located at a single designated entity where data from multiple RRHs may be processed coherently for the applications that may require timing sync among data from different RRHs (e.g., network multiple input multiple output (MIMO)).

RRH 150 may have a local timing adjustment process (i.e., delay) to adjust the downstream and upstream timing so they can be aligned. Downstream and upstream timing alignment may be required for supporting echo cancellation in FDX operation. The actual computation of the echo cancellation coefficients used in echo cancellation process may be done in cloud. Downstream and upstream alignment may be accomplished as follows: at the output of analog-to-digital converter 220, the interferences coupled from the downstream transmitter through port to port coupling, tap reflection, etc., may be aligned with the upstream desired signal within an Orthogonal frequency-division multiplexing (OFDM) cycle prefix (CP) window configured by the system. The downstream and upstream timing adjustment may be provided by commanded by virtual CMTS instance 140.

Figure 3:
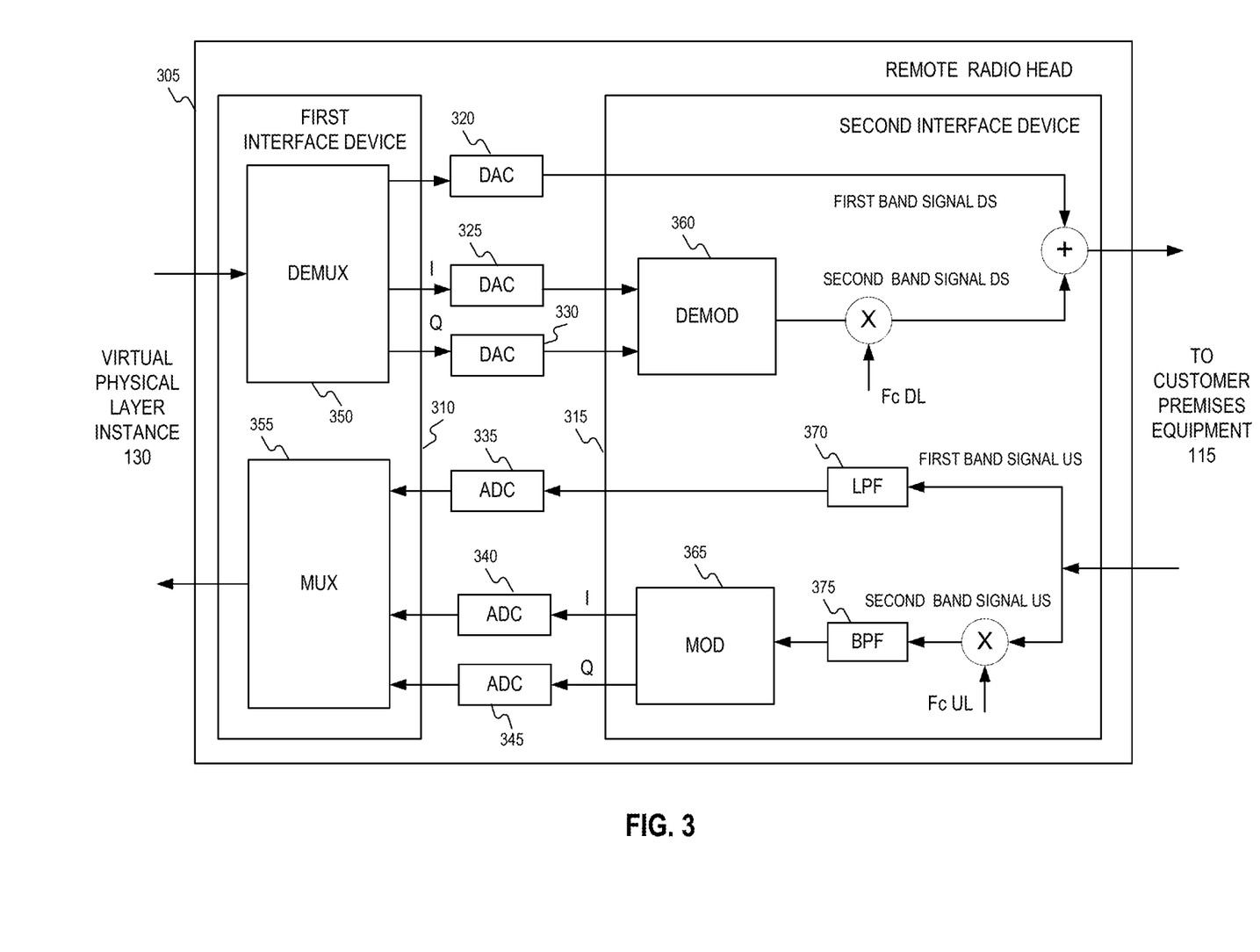
FIG. 3 is a block diagram of a remote radio head that supports multi-bands.
Figure 4:
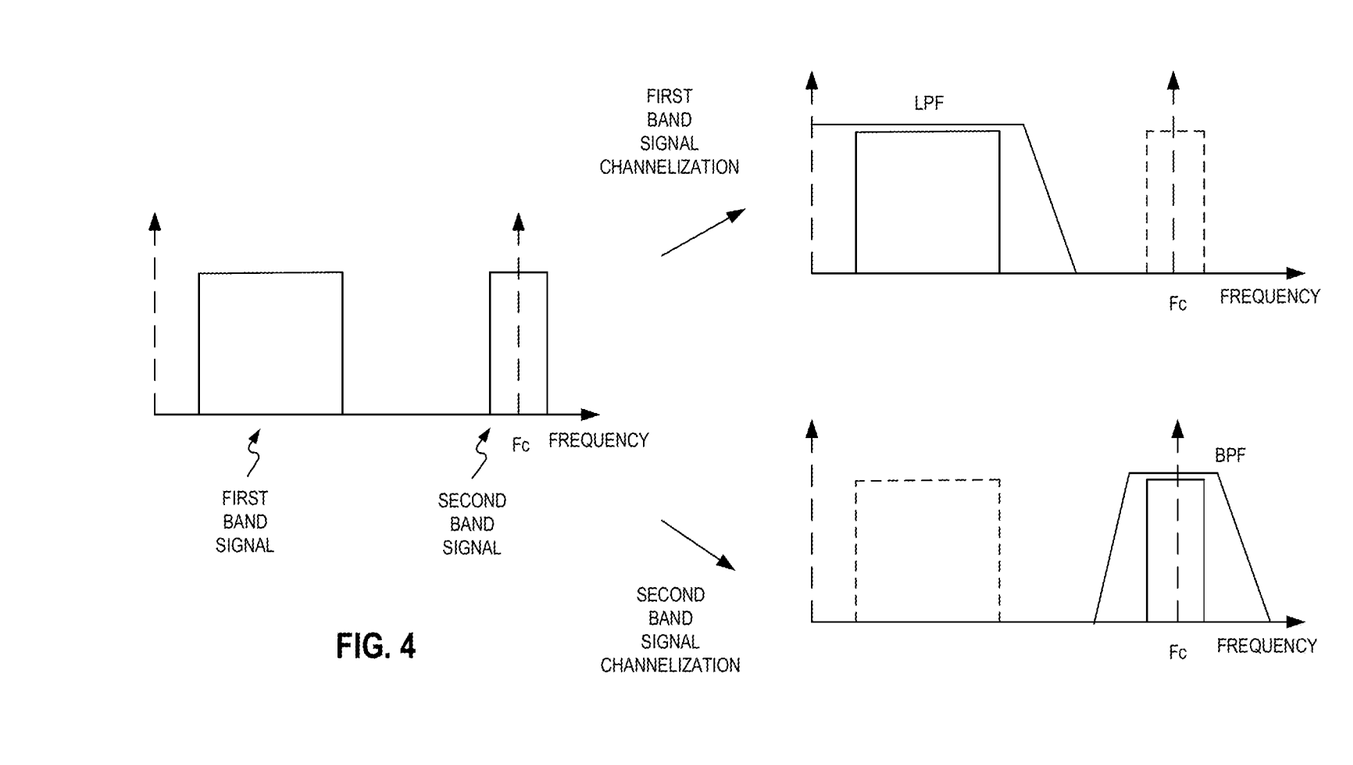
FIG. 4 illustrates channelization of multiple frequency bands.

FIG. 3 is a block diagram of a remote radio head (RRH) 305 that may support multi-bands that may be implemented through multiple analog-to-digital, multiple digital-to-analog, and multiple frequency conversions. In other words, while RRH 150 of FIG. 2 may support one band, remote RRH 305 of FIG. 3 may support multiple bands. As shown in FIG. 4, RRH 305 may channelize a first band signal and a second band signal. The first band signal may comprise, but is not limited to, a DOCSIS frequency spectrum and a second band signal may comprise, but is not limited to, a 5G frequency spectrum.

RRH 305 may carry out, for example, analog functions of the RPD that may not have been virtualized into virtual physical layer instance 130 as described above. These functions (i.e., analog functions) may comprise, but are not limited to, amplifier functionality, front end gain control, Radio Frequency (RF) filtering, and analog-digital data conversions, for example. Second interface device 315 may carry out, but is not limited to, amplifier functionality, front end gain control, automatic gain control, and Radio Frequency (RF) filtering on an analog signal.

As shown in FIG. 3, RRH 305 may comprise a first interface device 310, a second interface device 315, a plurality of digital-to-analog converters (i.e., a first digital-to-analog converter 320, a second digital-to-analog converter 325, and a third digital-to-analog converter 330), and a plurality of analog-to-digital converters (i.e., a first analog-to-digital converter 335, a second analog-to-digital converter 340, and a third analog-to-digital converter 345). First interface device 310 may comprise a de-multiplexer 350 and a multiplexer 355. Second interface device 315 may comprise a demodulator 360, a modulator 365, a low-pass filter (LPF) 370, and a band-pass filter (BPF) 375. Fc DL and Fc UL may comprise, respectively, the center frequencies of the second band downlink signal and the second band uplink signal.

Elements comprising RRH 305 (e.g., first interface device 310, second interface device 315, plurality of digital-to-analog converters, and a plurality of analog-to-digital converters) may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems. Furthermore, elements comprising RRH 305 may be practiced in a system-on-a-chip (SOC) where each or many of the elements may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components on the single integrated circuit (chip).

RRH 305 may convert downstream digital Layer-1 data received from virtual physical layer instance 130 over first link 155 to analog radio frequency (RF) for transmission over second link 160 to customer premises equipment 115. At first interface device 310, downstream data received from virtual physical layer instance 130 may be buffed (e.g., de-jitter), de-framed, de-multiplexed by de-multiplexer 350, and de-packetized into bits. The bits may be put in queues as inputs to the plurality digital-to-analog converters for different bands in the multi-band embodiments. For example, bits de-multiplexed for the first band may be put in queues and sent to first digital-to-analog converter 320. Bits de-multiplexed for the second band may be put in queues and sent to second digital-to-analog converter 325 and third digital-to-analog converter 330. The two different digital-to-analog converters (second digital-to-analog converter 325 and third digital-to-analog converter 330) may correspond to different Quality of Service (QoS) levels.

Similarly, RRH 305 may convert upstream RF signals received over second link 160 to digital for transmission over first link 155 to virtual physical layer instance 130. Second interface device 315 may channelize the signal received from customer premises equipment 115 into a first band signal and a second band signal using low-pass filter 370 and band-pass filter 375. As shown in FIG. 3, the first band signal may be sent to first analog-to-digital converter 335. The second band signal may be modulated, put in different queues with different QoS queues, and sent second analog-to-digital converter 340 and a third analog-to-digital converter 345.

Consistent with embodiments of the disclosure, at least one of the multiple channels in the multiple channel embodiment may be used as a backhaul for a small cell system. In this environment, the backhaul data rate may be dynamically scaled. The backhaul data rate may depend on the multiple factors, for example: the sampling rates of each band, the DAC/ADC bit width of samples of each band, the packetization/framing overhead, and other overhead (line coding, signaling, etc.). The backhaul data rate scaling may be performed through sampling and sample bit width dynamic adjustments. The DAC sampling rate may be optimized for each DAC for each band to minimize the backhaul data rate. The DAC sample rate of each band may be set at least twice as the signal bandwidth of that band. And the DAC sampling rates may be set in such a way that, after filtering out the DAC harmonics, the cross interferences among bands may be below the targeted levels. The ADC sampling rate may be optimized for each ADC for each band to minimize the backhaul data rate. The ADC sample rate of each band may be set at least twice as the signal bandwidth of that band. And the ADC sampling rates may be set in such a way that, after the ADC aliasing filtering, the ADC aliasing may be below the targeted levels. The sampling rate of the DAC or the ADC may be set through signaling link by virtual CMTS instance 140 for example. Furthermore, the sample bit width may be adjusted dynamically. The bit width of each DAC or ADC may be dynamically adjusted based on the signal quality requirements. In addition, the bit width of each DAC or ADC may be set through signaling link by virtual CMTS instance 140.

Figure 5:
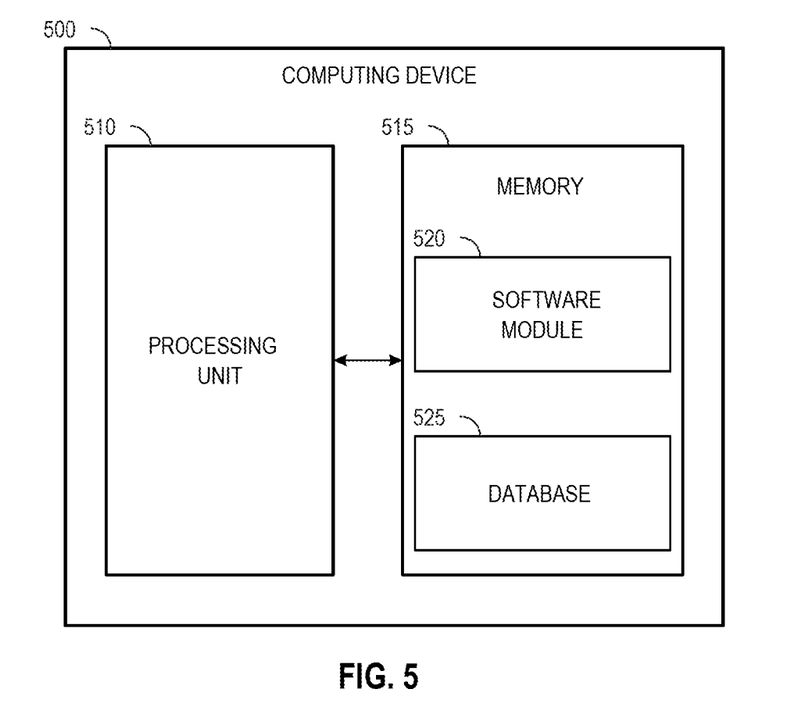
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing a virtual physical layer described above. Computing device 500, for example, may provide an operating environment for servers in server cluster 120, virtual CCAP core instance 125, virtual physical layer instance 130, control device 135, and first interface device 205, and first interface device 310. Servers in server cluster 120, virtual CCAP core instance 125, virtual physical layer instance 130, control device 135, first interface device 205, and first interface device 310 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
   a virtual physical layer instance; and
   a remote radio head connected to the virtual physical layer instance, wherein the remote radio head comprises:
      a first interface device,
      a second interface device,
      a digital-to-analog converter connected between the first interface device and the second interface device, and
      an analog-to-digital converter connected between the first interface device and the second interface device, the remote radio head configured to:
         send only Layer-1 data of the Open Systems Interconnection (OSI) model to the virtual physical layer instance, wherein the second interface device is configured to channelize user data received from a customer premise and put it into first different queues as an input to the analog-to-digital convertor to be sent as the Layer-1 data of the OSI model to the virtual physical interface, wherein each of the first different queues are associated with a different quality of service, and
         receive only Layer-1 data of the OSI model from the virtual physical layer instance, and wherein the first interface device is configured to process received Layer-1 data from the virtual physical layer and put in a second queue as an input of the digital-to-analog convertor to be provided to the customer premise.

2. The system of claim 1, wherein the first interface device is connected to the virtual physical layer instance.

3. The system of claim 2, wherein the first interface device performs the following on downstream digital data received from the virtual physical layer instance:
   buffers, de-frames, de-multiplexes, and de-packetizes into bits, wherein the bits are placed in a queue by the first interface as input to the digital-to-analog converter.

4. The system of claim 2, wherein the first interface device packetizes upstream digital data received from the analog-to-digital converter and queues the packetized data in First-In-First-Out (FIFO) fashion as input to the virtual physical layer instance.

5. The system of claim 1, wherein the second interface device is connected to customer premises equipment.

6. The system of claim 5, wherein the second interface device provides conditioning of an upstream analog signal received by the second interface device from the customer premises equipment prior to providing the upstream analog signal to the analog-to-digital converter.

7. The system of claim 6, wherein the provided conditioning comprises at least one of the following: amplification, front end gain control, and Radio Frequency (RF) filtering.

8. The system of claim 5, wherein the second interface device provides conditioning of a downstream analog signal received by the second interface device from the digital-to-analog converter prior to providing the downstream analog signal to the customer premises equipment.

9. The system of claim 8, wherein the provided conditioning comprises at least one of the following: amplification, front end gain control, and Radio Frequency (RF) filtering.

10. The system of claim 1, wherein the remote radio head is located at a junction of a fiber plant and a coaxial plant in a network.

11. The system of claim 10, wherein the network comprises a network Hybrid Fiber-Coaxial (HFC) network.

12. The system of claim 1, wherein the virtual physical layer instance is instantiated in a cloud-based environment.

13. An apparatus comprises:
   a first interface device connected to a virtual physical layer instance instantiated in a cloud-based environment;
   a second interface device connected to customer premises equipment;
   a digital-to-analog converter connected between the first interface device and the second interface device; and
   an analog-to-digital converter connected between the first interface device and the second interface device, wherein the apparatus is configured to:
      send only Layer-1 data of the Open Systems Interconnection (OSI) model to the virtual physical layer instance, wherein the second interface device is configured to channelize user data received from a customer premise and put it into first different queues as an input to the analog-to-digital convertor to be sent as the Layer-1 data of the OSI model to the virtual physical interface, wherein each of the first different queues are associated with a different quality of service, and
      receive only Layer-1 data of the OSI model from the virtual physical layer instance, and wherein the first interface device is configured to process received Layer-1 data from the virtual physical layer and put in a second queue as an input of the digital-to-analog convertor to be provided to the customer premise.

14. The apparatus of claim 13, wherein the first interface device performs the following on downstream digital data received from the virtual physical layer instance: buffers, de-frames, de-multiplexes, and de-packetizes into bits, wherein the bits are placed in a queue by the first interface as input to the digital-to-analog converter.

15. The apparatus of claim 13, wherein the first interface device packetizes upstream digital data received from the analog-to-digital converter and queues the packetized data in First-In-First-Out (FIFO) fashion as input to the virtual physical layer instance.

16. The apparatus of claim 13, wherein the second interface device provides conditioning of an upstream analog signal received by the second interface device from the customer premises equipment prior to providing the upstream analog signal to the analog-to-digital converter, wherein the provided conditioning comprises at least one of the following: amplification, front end gain control, and Radio Frequency (RF) filtering.

17. The apparatus of claim 13, wherein the second interface device provides conditioning of a downstream analog signal received by the second interface device from the digital-to-analog converter prior to providing the downstream analog signal to the customer premises equipment, wherein the provided conditioning comprises at least one of the following: amplification, front end gain control, and Radio Frequency (RF) filtering.

18. A method comprising:
 converting, by a virtual physical layer instance, first data received from a virtual Converged Cable Access Platform (CCAP) core instance into downstream Layer-1 data, the first data comprising at least one of the following: Data Over Cable Service Interface Specification (DOCSIS) data, Moving Picture Experts Group (MPEG) video data, and out-of-band (OOB) signals;
 sending, by the virtual physical layer instance, the downstream Layer-1 data to a remote radio head receive only Layer-1 data of the OSI model from the virtual physical layer instance, wherein the sent Layer-1 data is received at the remote radio head, and wherein a first interface device is configured to process received Layer-1 data from the virtual physical layer and put it in a first queue as an input of the digital-to-analog convertor to be provided to a customer premise;
 receiving, by the virtual physical layer instance, upstream Layer-1 data from the remote radio head, and wherein a second interface device of the remote radio head is configured to channelize user data received from a customer premise and put into second different queues as an input to the analog-to-digital convertor to be sent as the Layer-1 data of the OSI model to the virtual physical interface, wherein each of the second different queues are associated with a different quality of service;
 converting, by the virtual physical layer instance, the upstream Layer-1 data into second data, the second data comprising at least one of the following: DOCSIS data, MPEG video data, and OOB signals; and
 sending, by the virtual physical layer instance, the second data to the virtual CCAP core instance.

19. The method of claim 18, further comprising instantiating, by a control device, the virtual physical layer instance in a cloud-based environment.

* * * * *